(12) United States Patent
Kogan et al.

(10) Patent No.: US 10,608,243 B2
(45) Date of Patent: Mar. 31, 2020

(54) BATTERIES WITH REPLACEABLE ZINC CARTRIDGES

(71) Applicants: Iakov Kogan, Etobicoke (CA); Anna Khomenko, Etobicoke (CA)

(72) Inventors: Iakov Kogan, Etobicoke (CA); Anna Khomenko, Etobicoke (CA)

(73) Assignee: PANISOLAR INC., Mississauga, ON (CA)

( * ) Notice: Subject to any disclaimer, the term of this patent is extended or adjusted under 35 U.S.C. 154(b) by 419 days.

(21) Appl. No.: 15/081,885

(22) Filed: Mar. 26, 2016

(65) Prior Publication Data

US 2016/0351890 A1 Dec. 1, 2016

Related U.S. Application Data

(62) Division of application No. 14/840,020, filed on Aug. 30, 2015.

(Continued)

(51) Int. Cl.
*H01M 4/66* (2006.01)
*H01M 4/48* (2010.01)
(Continued)

(52) U.S. Cl.
CPC .......... *H01M 4/244* (2013.01); *H01M 2/026* (2013.01); *H01M 2/0262* (2013.01); *H01M 2/0277* (2013.01); *H01M 2/0282* (2013.01); *H01M 2/0287* (2013.01); *H01M 2/043* (2013.01); *H01M 2/0404* (2013.01);
(Continued)

(58) Field of Classification Search
CPC .. H01M 10/26; H01M 10/30; H01M 10/4235; H01M 12/005; H01M 2004/027; H01M 2004/028; H01M 2/026; H01M 2/0262; H01M 2/0277; H01M 2/0282; H01M 2/0287; H01M 2/0404; H01M 2/043; H01M 2/0482; H01M 2/162; H01M 2/1653; H01M 2/18; H01M 4/0404; H01M 4/244; H01M 4/26; H01M 4/32; H01M 4/34; H01M 4/42; H01M 4/52; H01M 4/54; H01M 4/62; H01M 4/661; H01M 4/70; H01M 4/808; H01M 8/188
See application file for complete search history.

(56) References Cited

U.S. PATENT DOCUMENTS

| | | | | |
|---|---|---|---|---|
| 4,246,324 A | * | 1/1981 | de Nora | H01M 4/8626 429/210 |
| 4,804,448 A | * | 2/1989 | Sammells | C25C 3/02 204/245 |

(Continued)

OTHER PUBLICATIONS

U.S. Appl. No. 13/602,443, filed Jul. 7, 2016, Iakov Kogan, Anna Khomenko.

(Continued)

*Primary Examiner* — Lingwen R Zeng (57) ABSTRACT

This application proposes the use of rechargeable and replaceable zinc cartridges to expand cycle life and lifetime of nickel-zinc and silver-zinc batteries. Two types of possible battery cell assemblies are demonstrated: a battery that includes face-to-back arrangement of cells, and side-by-side linked flat batteries that can be used as wall mounted batteries. An improved composition of the replaceable zinc electrode is suggested.

11 Claims, 6 Drawing Sheets

Related U.S. Application Data (60) Provisional application No. 62/167,581, filed on May 28, 2015.

(51) Int. Cl.

| | | |
|---|---|---|
| *H01M 2/14* | (2006.01) | |
| *H01M 10/30* | (2006.01) | |
| *H01M 4/70* | (2006.01) | |
| *H01M 12/00* | (2006.01) | |
| *H01M 2/02* | (2006.01) | |
| *H01M 4/24* | (2006.01) | |
| *H01M 4/38* | (2006.01) | |
| *H01M 4/80* | (2006.01) | |
| *H01M 4/32* | (2006.01) | |
| *H01M 4/42* | (2006.01) | |
| *H01M 2/18* | (2006.01) | |
| *H01M 2/04* | (2006.01) | |
| *H01M 2/16* | (2006.01) | |
| *H01M 4/34* | (2006.01) | |
| *H01M 4/52* | (2010.01) | |
| *H01M 4/54* | (2006.01) | |
| *H01M 4/62* | (2006.01) | |
| *H01M 8/18* | (2006.01) | |
| *H01M 10/26* | (2006.01) | |
| *H01M 10/42* | (2006.01) | |
| *H01M 4/02* | (2006.01) | |
| *H01M 4/04* | (2006.01) | |
| *H01M 4/26* | (2006.01) | |

(52) U.S. Cl.
CPC ......... *H01M 2/0482* (2013.01); *H01M 2/162* (2013.01); *H01M 2/1653* (2013.01); *H01M 2/18* (2013.01); *H01M 4/32* (2013.01); *H01M 4/34* (2013.01); *H01M 4/42* (2013.01); *H01M 4/52* (2013.01); *H01M 4/54* (2013.01); *H01M 4/62* (2013.01); *H01M 4/661* (2013.01); *H01M 4/70* (2013.01); *H01M 4/808* (2013.01); *H01M 8/188* (2013.01); *H01M 10/26* (2013.01); *H01M 10/30* (2013.01); *H01M 10/4235* (2013.01); *H01M 12/005* (2013.01); *H01M 4/0404* (2013.01); *H01M 4/26* (2013.01); *H01M 2004/027* (2013.01); *H01M 2004/028* (2013.01)

(56) References Cited

U.S. PATENT DOCUMENTS

| | | | |
|---|---|---|---|
| 4,886,572 A * | 12/1989 | Kimura | H01M 4/137 204/242 |
| 5,554,918 A * | 9/1996 | Harats | H01M 10/0422 429/185 |
| 5,824,434 A * | 10/1998 | Kawakami | H01M 2/14 429/209 |
| 6,432,585 B1 * | 8/2002 | Kawakami | C23C 18/31 429/209 |
| 7,112,389 B1 * | 9/2006 | Arora | H01M 2/162 361/502 |
| 2008/0208016 A1 | 8/2008 | Hughes et al. | |
| 2010/0062347 A1 * | 3/2010 | Li | H01M 6/10 429/344 |
| 2014/0147757 A1 | 5/2014 | Rollison | |

OTHER PUBLICATIONS

Linden's Handbook of Batteries, 4th Edition by Reddy, Thomas, p. 19-11.
Iakov Kogan, Anna Khomenko, Zinc Modules as Universal Energy Storage Units for Future Economy. Presented at the International Conference for Hydrogen Energy , Jun. 4, 2012.
Applicants' Reply to U.S. Appl. No. 14/840,020 Office Action uploaded on Jan. 24, 2019.
Applicants' Reply to U.S. Appl. No. 14/840,020 communication letter uploaded on Mar. 14, 2019.

\* cited by examiner

BATTERIES WITH REPLACEABLE ZINC CARTRIDGES

This application is divisional of prior application Ser. No. 14/840,020 filed on Aug. 30, 2015, which claims priority of provisional application No. 62/167,581 as of May 28, 2015, and provisional application No. 62/07,926 as of Nov. 13, 2014, and provisional application No. 62/044,666 as of Sep. 2, 2014. This application claims priority of provisional application No. 62/167,581 as of May 28, 2015.

FIELD OF THE INVENTION

This invention relates to the energy storage devices with zinc cartridges.

BACKGROUND OF THE INVENTION

Energy storage is the fundamental element of future economy. Batteries are essential components of electric grid, electric buses, reserve power, electric tools and mobile devices. The commercialization of high performance batteries is vital for growth of any industry.

Today, the most common storage devices are lithium batteries: the energy density is high; load characteristics are reasonably good, cycle life is sufficient for many applications. Despite overall advantages, a lithium battery requires a protection circuit to maintain safe operation. The maximum charge and discharge current is limited to 2 C, and capacity deterioration can be noticeable after one year whether the battery is in use or not. The production of lithium batteries requires at least 40%-50% more investments than nickel-cadmium batteries.

A lithium battery is known as the source of three types of hazards: ignition source, fuel for existing fire, and the source of pressure pulse in the condition of thermal runaway. Recent fires with 1.5 MWh Electrovaya battery in Arizona, lithium battery problems at Boeing Dreamliner, Chevrolet Volt and Tesla motivate users to look for new storage solutions.

Rechargeable zinc batteries are considered a prospective substitute for lithium batteries. Zinc electrodes can be used in nickel-zinc, silver-zinc, zinc-air, zinc-manganese dioxide, zinc-polyaniline and other storage devices. High specific energy, low cost, safety, and vast natural resources have drawn attention to zinc as a prospective electrode for rechargeable batteries.

Zinc-air batteries are the most attractive from the point of view of energy density and low cost. However zinc-air batteries have low recharging efficiency about 0.5-0.6 and moderate power. The imperfections of zinc-air batteries can be eliminated by the use of nickel-zinc batteries with long life nickel oxide-hydroxide electrodes. (Nickel oxide-hydroxide electrodes are referenced below as nickel electrodes.)

The nickel-zinc battery is well known, and characterized with high (for alkaline battery) voltage 1.65V, recharging efficiency 0.8-0.9, and high power that exceeds performance of lithium batteries to operate at 5 C. The energy density of nickel-zinc batteries is approximately 30%-35% higher than that of nickel cadmium batteries, which production is phasing out because of cancerogenicity concerns. Nickel-zinc batteries are less expensive than their cadmium cathode analogs.

Silver-zinc battery is one of the best of energy storage devices because of the highest specific energy density and excellent power capabilities. The voltage is 1.55V, and the device can provide 40% more runtime than lithium batteries. Silver-zinc battery is alkaline based storage device, and it is free from thermal runaway and flammability of the lithium batteries. The application of silver-zinc batteries is limited by its cost and cycle life.

Major common disadvantage of all zinc rechargeable batteries is relatively short lifetime, and cycle life of the zinc anode about 300-800.

The objective of this invention is to increase lifetime and cycle life of rechargeable batteries with zinc anodes. Another objective is to propose the assembly of nickel-zinc battery cells suitable for home use and other applications.

BRIEF SUMMARY OF THE INVENTION

This invention proposes the use of rechargeable and replaceable zinc cartridges to extend lifetime and cycle life of nickel-zinc batteries. In general a zinc cartridge of this invention includes an electroactive zinc composition, a collector, the product of zinc oxidation, usually zinc oxide, separator or/and an ion-selective membrane. The idea is to replace zinc cartridge at a small portion (for example 10%) of the battery cost when the zinc anode is deteriorated as the result of multiple charge-discharge cycles, or for any other reason. Considering lifetime and cycle life of the nickel electrode, it can be used for a long period of time about ten years without replacement. Taking 10% as an example, the lifetime of the nickel-zinc battery with the replaceable zinc cartridges can be extended tenfold by annual replacement of the zinc cartridges; the total price of the storage device will be increased by 10% annually what will give 90% cost saving.

The application of described above technology to silver-zinc batteries will be even more effective because of the higher cost of silver electrode: the zinc cartridge will be replaced at about 0.5%-2% of the battery cost in this case.

DETAILED DESCRIPTION OF THE INVENTION

Figure 1:
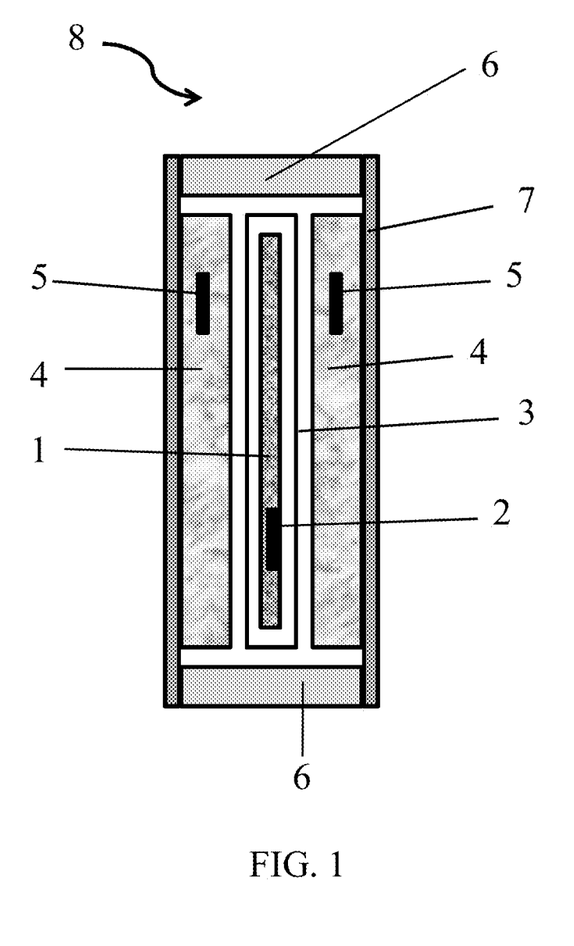
FIG. 1 shows horizontal cross section of the nickel-zinc elemental cell that includes a replaceable zinc cartridge 1 with current collector 2, two nickel cathodes 4 with current collectors 5 separated from zinc cartridge 1 by ion conducting membrane 3 base 6 and walls 7.

A horizontal cross section of a nickel zinc battery cell with two nickel cathodes and a replaceable zinc cartridge is shown in FIG. 1. The use of two nickel cathodes per one zinc anode can be motivated by high energy density of the zinc electrode. Other designs can include one zinc electrode per one nickel electrode, or two zinc electrodes per three nickel electrodes, or four zinc electrodes per five nickel electrodes. Other combinations can be implemented depending on expected energy and power characteristics.

Figure 2:
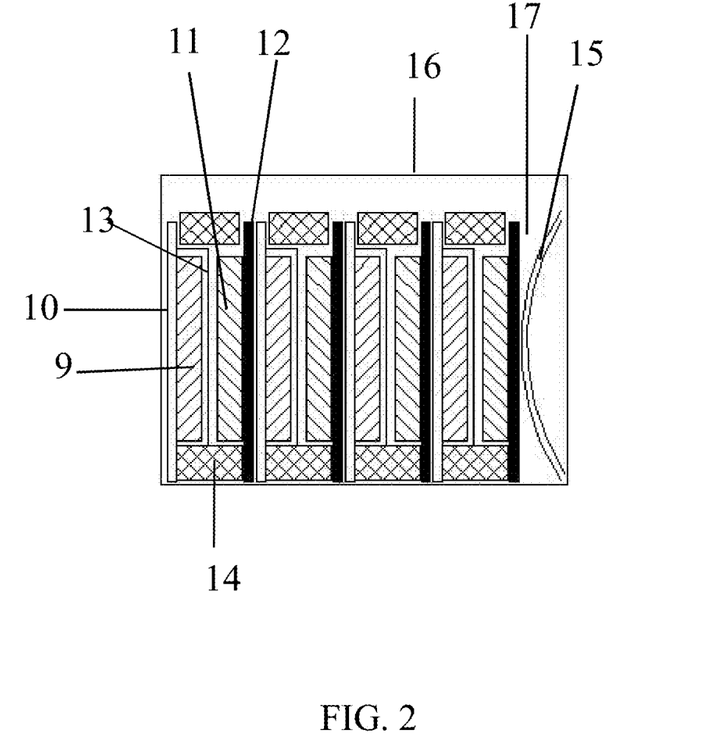
FIG. 2 demonstrates horizontal cross section of four cells assembly where a cell is formed of one zinc 9 and one nickel 11 electrodes, and the cells are compressed with the spring 15.

Main components of the nickel-zinc battery cell presented in FIG. 1 include the replaceable zinc anode 1 with collector 2 optionally wrapped in the separator 3, two nickel electrodes 4 with current collectors 5. The case is formed by gluing sheets 7 to U-shaped base 6. Another cell design includes nickel and zinc electrodes fixed directly to the base 14 as shown in FIG. 2. In this case electrodes 9, 11 with their current collectors 10 and 12 form the cell walls. The cap of the cell (not shown in the figure) can be made of rubber, plastic, ceramic or electrically isolated metal. The cap can include a micro hole with a hydrophobic film to eliminate excess of oxygen produced during charging. Preferable conditions of charging exclude the production of oxygen by charging to 80%-90% of the cell capacity. A micro check valve is also applicable to prevent building high pressure. In a completely sealed cell occasionally produced oxygen can be reduced at the zinc electrode.

An example of a battery assembly made of four cells packed in a case is shown in FIG. 2. Each cell includes a replaceable zinc electrode 9 with collector 10, a nickel cathode 11 with collector 12. The zinc electrode is separated from nickel electrode with separator or ion selective membrane 13. The cells are placed in case 16 filled with the electrolyte 17. The electrodes 9, 11 with their current collectors 11, 12 are held in contact with bases 14, and the cells are in contact with each other by compression with spring 15. The shape of the spring is selected as an example only, and can be replaced by other shapes. For example the electrodes can be compressed with a tapered rubber sheet. The zinc and nickel electrodes are not glued to the bases so that all construction can be simply disassembled by eliminating the spring 15.

The battery can also work as flow battery by adding at least one outside pump, filter and two tubes connected to the battery. Possible purpose of using a flow battery is conditioning the electrolyte by filtering and eliminating impurities.

The collectors to zinc and nickel electrodes are made of low surface area conducting sheet on one side, and high surface area conducting sheet on the other side. For example, the current collector to the nickel electrode can be produced by soldering or welding a piece of nickel foam to a nickel foil of appropriate thickness, for example in the range 0.05 mm-0.5 mm. Then electroactive nickel composition is imbedded into nickel foam to produce a rechargeable nickel electrode.

The zinc electrode of the first cell, and the nickel electrode of the last one are attached to the battery output connectors (not shown in FIG. 2) protruded through the case wall. The case 16 is filled with the electrolyte 17.

Figure 3:
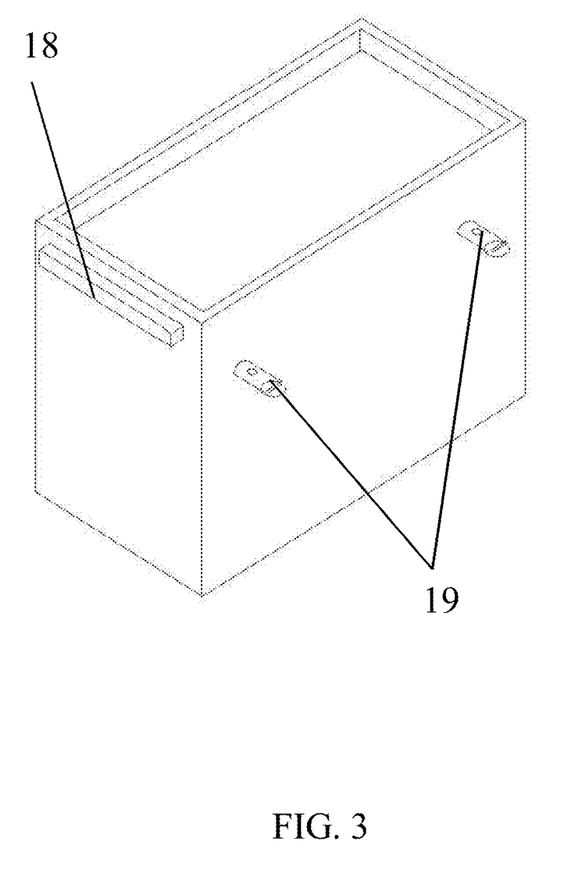
FIG. 3 shows possible outer design of a nickel-zinc battery with replaceable cartridges. The battery can be disassembled by sliding the upper lid 18.

The possible outer view of a nickel-zinc battery is shown in FIG. 3. The case includes moveable lid 18, and output current collectors 19 protruded through the case wall. Specific feature of a nickel-zinc battery of FIG. 3 is a removable upper lid 18 that can be eliminated by sliding along the battery. There are numerous different possible designs of the upper lid 18, but common feature is the possibility to remove it to replace zinc cartridges.

Figure 4:
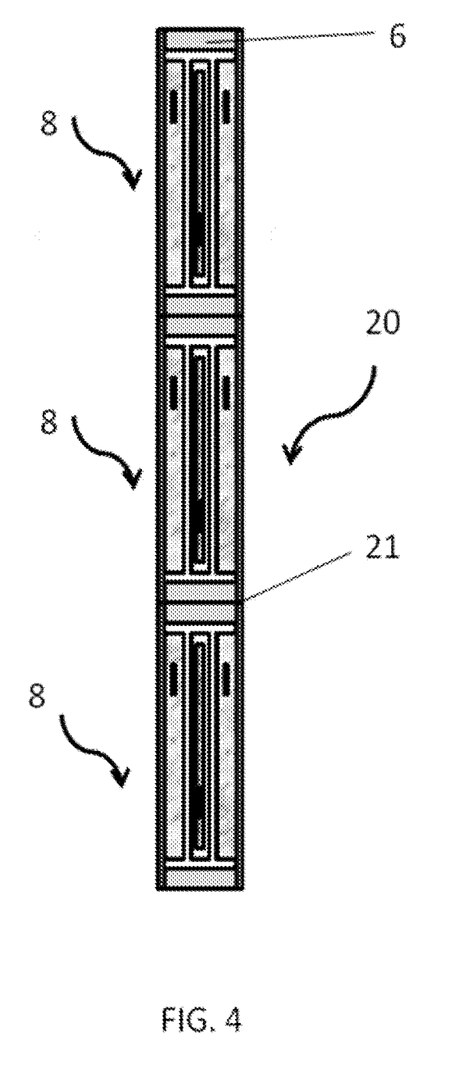
FIG. 4 displays a flat module 20 made of battery cells 8 of FIG. 1 where the cells are linked side-by-side.
Figure 5A:
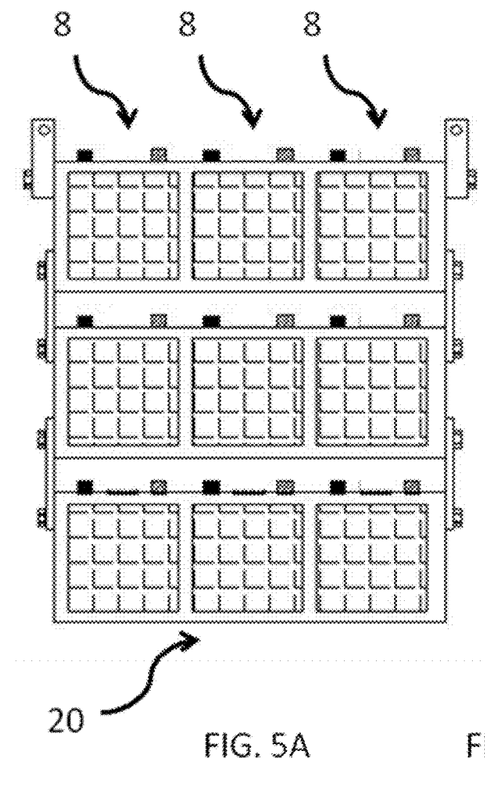
FIG. 5A shows the front view of the wall mounted battery assembled from three flat modules 20 vertically connected using rotational joints 21.
Figures 5B, 5C:
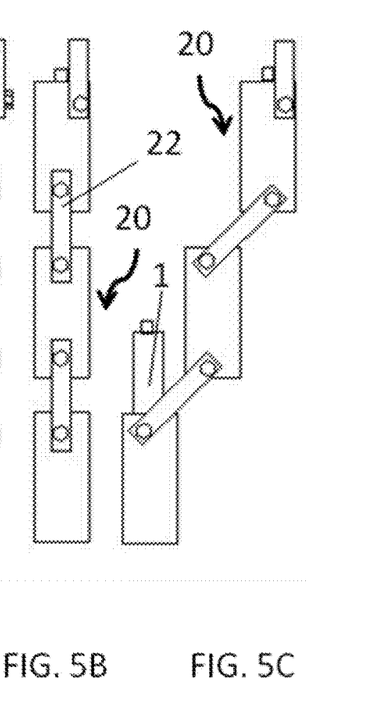
FIG. 5B shows the side view of the wall mounted battery of FIG. 5A.
FIG. 5C shows the side view of the wall mounted battery of FIG. 5A where the joints 21 are rotated to make suitable the replacement of the zinc cartridges 1.

FIG. 4 shows flat nickel-zinc modules 20 arranged by linking cells 8 of the FIG. 1 through their edges. The modules 20 can be fixed to the racks as shown in FIGS. 5A and 5B. The racks can include rotational joints 21 that help to move the modules 20 forward to replace zinc cartridges 1 as shown in FIG. 5C. The bases 6 of the the cells 8 can be made of plastic, rubber or ceramic, and the bases can be united to form one common base that can be assembled from two pieces (not shown in FIG. 4) that are glued to each other. Then side walls 21 are to the bases 6. Nickel 4 and zinc 1 electrodes are placed inside the cells formed by bases 6 and walls 21. Every cell is provided with a removable rubber or a plastic cap not shown in FIG. 4.

Figure 6:
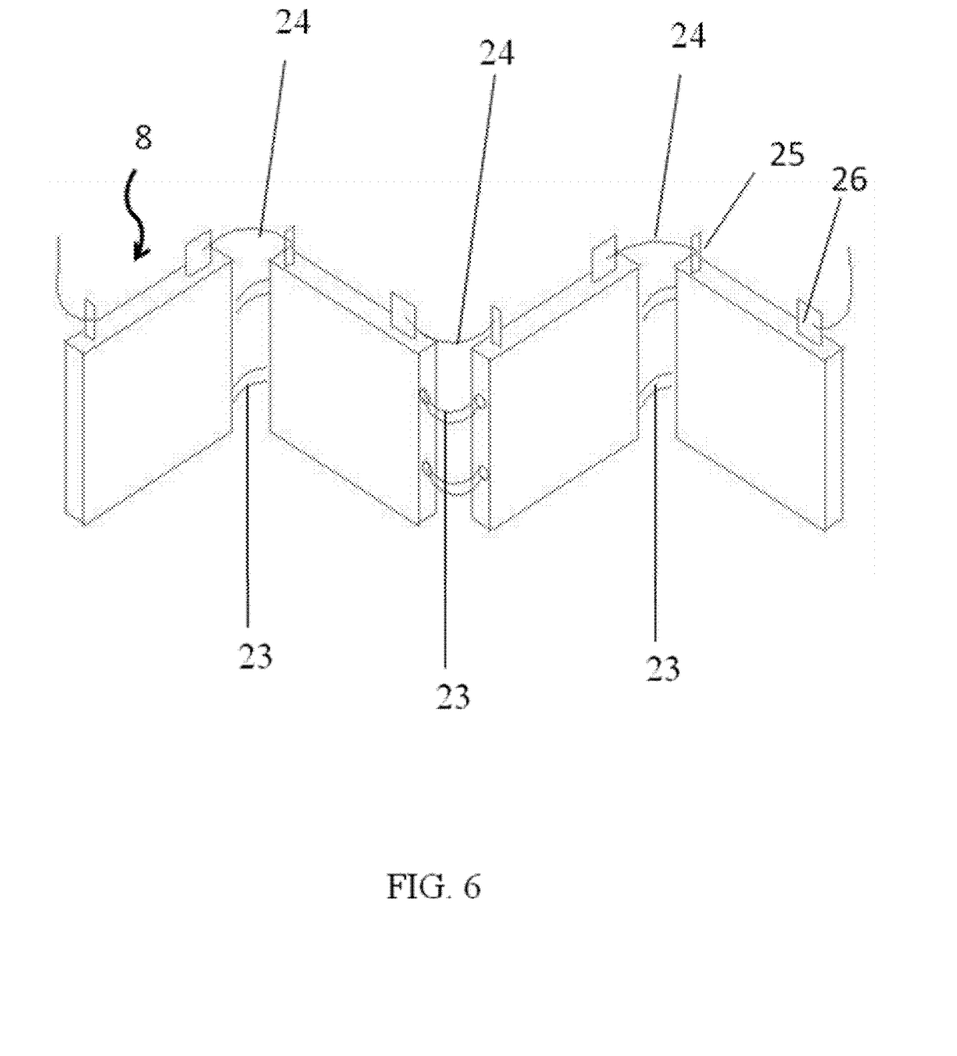
FIG. 6 demonstrates a foldable nickel-zinc battery optionally made of cells 8. Cells 8 are linked to each other with flexible tubes 23. Cells 8 have two—outputs 25 and 26: one 25 coming from the current collector 2 of the replaceable zinc cartridge 1, and another 26 from united current collectors 5 of the nickel cathodes 4.

A foldable version of the flat battery is shown in FIG. 6. Elemental cells 8 (as possible example) are joined with flexible tubes or strips 23 made of metal, plastic or rubber while the cell outputs are connected with conducting wires 24. The foldable battery can be used to attach the device to the man's body, or to locate the battery in complex spaces.

A battery case can be produced from polyethylene, polypropylene, polymethylmetacrylate, or any other plastic stable in alkaline solutions. Metal sheet, for example stainless steel, or steel covered by nickel, rubber or casted ceramic can be also used. Possible materials for sliding lid 18 include metals, rubbers, plastics, ceramic materials and their composites.

The material of the collector 2 to the zinc electrode 1 can be selected from copper, copper alloys, nickel, nickel alloys, lead, lead alloys, steel, stainless steel, bismuth, bismuth alloys, tin, tin alloys, carbon, graphite, expanded graphite, graphene, composites of graphite materials, plastics and rubber.

The current collector can be made of metal foil, corrugated metal foil, mesh, expanded metal sheet, foam, and the combination of these materials. A dual current collector includes low surface area material on one side, and high surface area material on the other side. For example metal foil can be soldered to metal foam, expanded foil or metal mesh with two parts connected to each other by welding, soldering, ultrasonic or laser welding. The metals can be similar or different depending on application requirement. For example copper foil is prime choice when high conducting collector is needed. Dual type collector can be used for both nickel and zinc electrodes.

The current collector can be covered by an additional layer to increase conductivity, to protect from corrosion, to improve mechanical, chemical or physical properties as required by the system. The current collector can be covered by zinc, tin, lead indium, bismuth, antimony, nickel, silver or their alloys. The amount of the second component of alloy is about 0.1%-50%. Said layer can be deposited by electroplating, electroless plating, hot metallization, painting, liquid metal pulverization, rubbing, and dipping.

The third component can be added to alloy if required. For example a three component current collector based on Zn—Cu—Bi alloy can be used for replaceable zinc electrode. Three component current collector can be prepared similar to two component collector described above. For example, a zinc electrode current collector has been produced by casting Zn—Bi—Cu alloy with mass content 80% Zn, 15% Bi and 5% Cu on brass mesh at 550° C.

Current collector for nickel hydroxide electrode is produced from nickel, titanium, stainless steel, cobalt, lead, and alloys of mentioned metals. The current collector can be formed as mesh, foam, corrugated metal sheet, or expanded metal. Corrosion stability of current collectors can be improved by anodic treatment of stainless steel and other metals in the electrolytes that include amines and their derivatives, for example diphenylamine. To improve this process a soluble complex between amine and platinum group metal, for example ruthenium, can be used. Complexes of other platinum group metals with conjugated amines can be applied.

The zinc electrode can be formed from zinc powder or zinc oxide doped with indium, aluminum, lead, bismuth to inhibit zinc corrosion. Zinc or/and zinc oxide paste can also include carboxymethylcellulose, polyvinyl alcohol, polyacrylic acid, polyamines, surface active compounds, carbons, graphite to insure stable operation. The zinc electrode can further include materials that improve its performance, for example zirconia fibers in the amount 0.1%-5% or hydroxides of second group metals, for example calcium or barium hydroxides. The zinc electrode can be wrapped in the battery separator and ion selective membrane. The upper end and lower ends of the separator or membrane can be sealed with material stable in the alkaline electrolyte.

Another approach is to cover the surface of the zinc electrode with a layer of anion selective membrane. For this purpose a composition is prepared from anion selective material by mixing with an adhesive, for example soluble ptfe. Ptfe is added in the amount 0.5%-10%. The zinc electrode with a current collector are dipped into liquid suspension, and dried at elevated temperature about 60 C.°-70 C.°. The layer can be made partially porous by adding a water soluble component to be dissolved when the zinc electrode is introduced in water. An example of the additive is ammonium carbonate, which can be also eliminated by heat treatment. The example of an anion exchange material for deposition is quaternary ammonia polysulfone.

For the purpose of this patent application the zinc cartridge should be as cheap as possible. Therefore the design of the zinc electrode (or cartridge) is the simplest, and does not include any expensive compound. In this case the cost of replacement can be decreased to 5%-15% of the nickel-zinc battery cost.

Nickel oxide-hydroxide electrode can be formed from nickel hydroxide that can be oxidized to nickel oxide-hydroxide. The electrode includes 1%-10% of cobalt and 1%-7% of zinc. The electrode can also include aluminum in the amount 1%-20%. The electrode might contain a binder in the amount 0.1%-5%. Possible binder is ptfe.

Electrolyte includes one of several ion conducting materials selected from the group consisting of potassium hydroxide, sodium hydroxide, lithium hydroxide, tetrabutylammonium hydroxide in total concentration in the range 1 M/L to 7 M/L. Following materials can be added to improve properties of the electrolyte: borates, fluorides, acetates, citrates, carbonates, polyacrylic acid, or carboxymethylcellulose. In certain cases electrolyte in the pH range 3-13 can be used.

What is written above in relation to the nickel-zinc battery is applicable to the silver-zinc battery. In this case the applicability of the replaceable cartridges for extending cycle life and lifetime of silver-nickel battery depends on performance of the silver electrode.

An Example of Practical Implementation.

Nickel hydroxide doped with Zn 2% and Co 5% has been prepared by the addition of nitrate salts to ammonia and alkaline solutions. Precipitated nickel hydroxide was washed with distilled water three times. Then hydroxide was precipitated in a centrifuge at 1500 rpm, and dried in vacuum at 70 C° for 5 h. Nickel hydroxide was mixed with nickel powder 15%, ptfe 1% and distilled water to form a paste. The paste was impregnated into nickel foam current collector, which was oxidized at 0.25 A for approximately 5 h in a three electrode cell with a nickel foil electrode as a counter electrode, and zinc wire as a pseudo reference electrode.

The zinc paste was prepared by mixing of the zinc powder doped with Bi 0.5% and In 0.5% with graphite 5%, ptfe 1% and 2% polyaminodiphenylamine. The paste was attached to the lead current collector and wrapped into polypropylene separator. The case was prepared by gluing two polypropylene sheets to a polypropylene base. The cap was made of polysilicon rubber. The zinc electrode and the nickel electrode were placed into case, filled with 30% of KOH and sealed with the cap. The battery voltage was 1.7V, the voltage under 0.5 A current was 1.66V, and voltage under 3 A load 1.52V. The zinc cartridge could be removed from the battery and exchanged by another one to achieve similar performance.

The invention claimed is:

1. A mechanically rechargeable battery cell comprising
   a) at least one zinc anode comprising an anode current collector, and a zinc electroactive composition that includes zinc particles and additives in contact with said anode current collector,
   b) at least one doped nickel hydroxide cathode that includes a cathode current collector, and a nickel hydroxide electroactive composition with additives in contact to said cathode current collector,
   c) an ion conducting electron blocking separator between said zinc anode and nickel hydroxide cathode,
   d) an electrolyte, and
   e) a case that includes a body, a cap, and an optional relief valve in the cap, and accommodates said zinc anode, said nickel hydroxide cathode, said separator and said electrolyte,
   wherein
   f) said zinc anode is preconditioned before assembling the battery by in situ electrochemical oxidation in a separate electrochemical cell to produce doped zinc oxide layers on the surfaces of the zinc particles, and
   g) said zinc anode is hermetically sealed with said ion conducting separator, and
   h) the zinc anode includes additives selected from the group consisting of graphite, carbon, bismuth, lead, aluminum, indium, carboxymethylcellulose, polyacrylic acid and polyvinyl alcohol, and
   i) the zinc anode further includes polyaminodiphenylamine, and zirconia fibers in amount 0.1 w %-15 w %, whereby the battery is electrochemically rechargeable.

2. The battery of claim 1 wherein said separator is ion-selective, and forms a layer on the zinc anode.

3. The battery of claim 1 wherein the case includes plurality of zinc and nickel hydroxide electrodes.

4. The battery of claim 1 wherein the nickel hydroxide cathode is electrochemically rechargeable and mechanically replaceable.

5. The battery of claim 1 wherein the case is made of materials selected from the group consisting of plastic, plastic composition, rubber, rubber composition, ceramic, ceramic composition, metal foil, and metal foil composition.

6. The battery of claim 1 wherein the zinc anode current collector is made of
   a) material selected from the group consisting of copper, nickel, silver, gallium, lead, bismuth, indium, antimony, and their alloys, and b) stainless steel, and c) materials listed in a) and b) and covered with a layer of material selected from the group consisting of zinc, tin, indium, lead, copper, bismuth, antimony, nickel, silver and their alloys.

7. The battery of claim 1 wherein the anode current collector and the cathode current collector are made of low surface area materials on one side, and large surface area materials on the other side.

8. The battery cell assembly of the battery cells of claim 1.

9. The battery cell assembly of the battery cells of claim 1 wherein the cases a) are united via their vertical edges to form modules, and b) the modules are assembled in racks to form flat wall mounted batteries.

10. The battery cell assembly of the battery cells of claim 1 wherein the cell assemblies are united using rotational joints.

11. The battery cell assembly of the battery cells of claim 1 wherein multiple zinc anodes and multiple nickel hydroxide cathodes are arranged consequently face-to-back, and the case includes a spring means for compression said zinc anodes and nickel hydroxide cathodes to each-other.

* * * * *